United States Patent
Shuster

(10) Patent No.: US 7,228,327 B2
(45) Date of Patent: Jun. 5, 2007

(54) METHOD AND APPARATUS FOR DELIVERING CONTENT VIA INFORMATION RETRIEVAL DEVICES

(75) Inventor: Gary Stephen Shuster, Fresno, CA (US)

(73) Assignee: Hoshiko LLC, Bellevue, WA (US)

( * ) Notice: Subject to any disclaimer, the term of this patent is extended or adjusted under 35 U.S.C. 154(b) by 617 days.

(21) Appl. No.: 09/850,956

(22) Filed: May 8, 2001

(65) Prior Publication Data

US 2002/0059370 A1 May 16, 2002

Related U.S. Application Data

(60) Provisional application No. 60/203,169, filed on May 8, 2000.

(51) Int. Cl.
*G06F 15/13* (2006.01)

(52) U.S. Cl. .................. 709/203; 707/10; 701/213

(58) Field of Classification Search ............... 709/203; 707/10; 701/213
See application file for complete search history.

(56) References Cited

U.S. PATENT DOCUMENTS

| | | | |
|---|---|---|---|
| 6,240,365 B1 * | 5/2001 | Bunn | 701/213 |
| 6,266,668 B1 * | 7/2001 | Vanderveldt et al. | 707/10 |
| 6,397,206 B1 * | 5/2002 | Hill et al. | 707/2 |
| 6,654,891 B1 * | 11/2003 | Borsato et al. | 726/6 |
| 6,665,658 B1 * | 12/2003 | DaCosta et al. | 707/3 |
| 2001/0054087 A1 * | 12/2001 | Flom et al. | |
| 2002/0120629 A1 * | 8/2002 | Leonard | |

* cited by examiner

*Primary Examiner*—Jinsong Hu
(74) *Attorney, Agent, or Firm*—Connolly Bove Lodge & Hutz LLP; Jonathan Jaech

(57) ABSTRACT

A method for anticipating a user's desired information using a PDA device connected to a computer network is provided. This method further comprises maintaining a database of user tendencies within the computer network, receiving sensor data from the user's physical environment via the PDA device, generating query strings using both tendency data and sensor data, retrieving data from external data sources using these generated query strings, organizing the retrieved data into electronic folders, and delivering this organized data to the user via the PDA device. In particular, a data management module anticipates the type of information a user desires by combining real time data taken from a sensor unit within a PDA and data regarding the history of that particular user's tendencies stored within the data management module.

23 Claims, 5 Drawing Sheets

METHOD AND APPARATUS FOR DELIVERING CONTENT VIA INFORMATION RETRIEVAL DEVICES

CROSS-REFERENCE TO RELATED APPLICATION

This application claims priority pursuant to 35 U.S.C. §119(e) to U.S. Provisional Application No. 60/203,169, filed May 8, 2000, which application is specifically incorporated herein, in its entirety, by reference.

BACKGROUND OF THE INVENTION

1. Field of the Invention

The present invention relates to applications pertaining to information retrieval devices (IRD's) connected to the Internet. More specifically, this invention relates to a method and apparatus for anticipating a user's desired information and delivering this information to the user through an IRD device, such as a personal digital assistant (PDA).

2. Description of Related Art

Computers are currently being used as electronic encyclopedias, with searches becoming increasingly sophisticated and with larger amounts of data being available to the user. Computers suitable for performing such tasks are referred to herein as information retrieval devices (IRD's). A highly portable and particularly useful embodiment of an IRD is represented by personal digital assistants (PDA's). However, IRD's remain unable to perform even the most basic task of anticipating the needs of the user and gathering information related to those needs without the user having to enter such needs.

The market for IRD's has become increasingly popular over the past few years. For style-conscious users looking for the latest in electronic organization, PDA's are an attractive option because of their ability to provide users with a plethora of computing functions in a small, portable device. A PDA is defined here as a handheld device that performs various computing functions for the user. In this respect, a PDA is often referred to as a handheld personal computer, capable of performing such tasks as an address book, notepad, appointments diary, and phone list. With the growth of PDA technology, however, these capabilities began to include more demanding applications such as spreadsheets, word processors, databases, financial management software, and games. Today, the emergence of wireless web technology has provided PDA manufacturers with the additional feature of accessing the Internet to market their respective products.

It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

Although the ability to retrieve information from the Internet using PDA devices is generally known in the art, an automated procedure for retrieving anticipated information generated according to sensory data taken from the PDA does not exist. It would thus be advantageous to implement a method and apparatus which anticipates a user's desired information and delivers this information directly to the user through a PDA device.

SUMMARY OF THE INVENTION

In an embodiment of the invention, a method for anticipating a user's desired information using an information retrieval device (IRD) connected to a computer network is provided. This method further comprises maintaining a database of user tendencies within the computer network, receiving sensor data from the user's physical environment via the IRD, generating query strings using both tendency data and sensor data, retrieving data from external data sources using these generated query strings, organizing the retrieved data into electronic folders, and delivering this organized data to the user via the IRD. In particular, a data management module anticipates the type of information a user desires by combining real time data taken from a sensor unit within an IRD and data regarding the history of that particular user's tendencies stored within the data management module.

In one such embodiment, an IRD sensor unit may be comprised of a "Dictation" setting enabling the user to dictate a conversation in real time. In this type of embodiment, a user may simply select a setting corresponding to "Dictation". In other embodiments, more sophisticated "Dictation" settings may also be implemented. Such embodiments may include a textual analysis which launches certain applications whenever particular names are detected. For example, if the name "John Doe" is detected, the IRD would relay any available information regarding "John Doe" to the user from the data management module. It should be appreciated that such information may include user-specific information obtained directly from the data management module (e.g., an address book, calendar, etc.) or information obtained from external data sources (e.g., an online database, search engine, etc.). It should further be appreciated that the device may use both user tendencies and data relating to the physical environment in order to choose between and prioritize multiple matching results, as for example picking the ten "John Doe" matches that live closest to the physical location of the user and organizing them by that proximity, or by returning the "John Doe" matches that are lawyers based upon the user's tendency to request further information on past matches who were lawyers.

Another such embodiment may include a hybrid recording and transcription sensor setting. In this embodiment, the IRD may generate a running transcript which includes the locations of the speakers relative to the IRD in order to differentiate between different speakers in a conversation. In cases where the IRD is unable to convert a sound into a word, the sound is simply recorded and included in the transcript as a hyperlink. An additional feature to this embodiment may include a real time translator application which translates between languages.

In another embodiment, the IRD sensor unit may include a GPS receiver that enables the IRD to retrieve information within the context of data received by the GPS receiver. For example, if the GPS signal indicates that the user is in Japan, the data management module may give weight to search results related to Japan.

It should be appreciated that data ascertained from a GPS receiver may also be used to present information about a particular establishment or area the user is in. In this type of embodiment, a real estate broker, for example, may approach a home for sale and receive a list of information regarding that particular home. Such information may include the address of the home, the sale price of the home, and information regarding the neighborhood of the home organized in several electronic folders.

In another embodiment, the IRD may be used to analyze ambient sounds detected by its sensor unit. In this embodiment, the IRD may, for example, identify the song and artist of music detected by the sensor unit through a spectral analysis of the sensor data. Similarly, the IRD may also be used to detect sounds from a telephone touch dial and determine the numbers being dialed. An added feature to this embodiment may include a reverse lookup of the phone number which would display information regarding the person on the receiving end of the call.

A more complete understanding of a method and apparatus for delivering content via informational retrieval devices will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE
PREFERRED EMBODIMENT

The present invention is directed towards a method and apparatus for delivering content via informational retrieval devices. In particular, a data management module anticipates the type of information a user desires by combining real time data taken from a sensor unit connected to the IRD and data regarding the history of that particular user's tendencies stored within the data management module. In the detailed description that follows, it should be appreciated that like element numerals are used to describe like elements illustrated in one or more figures.

Figure 1:
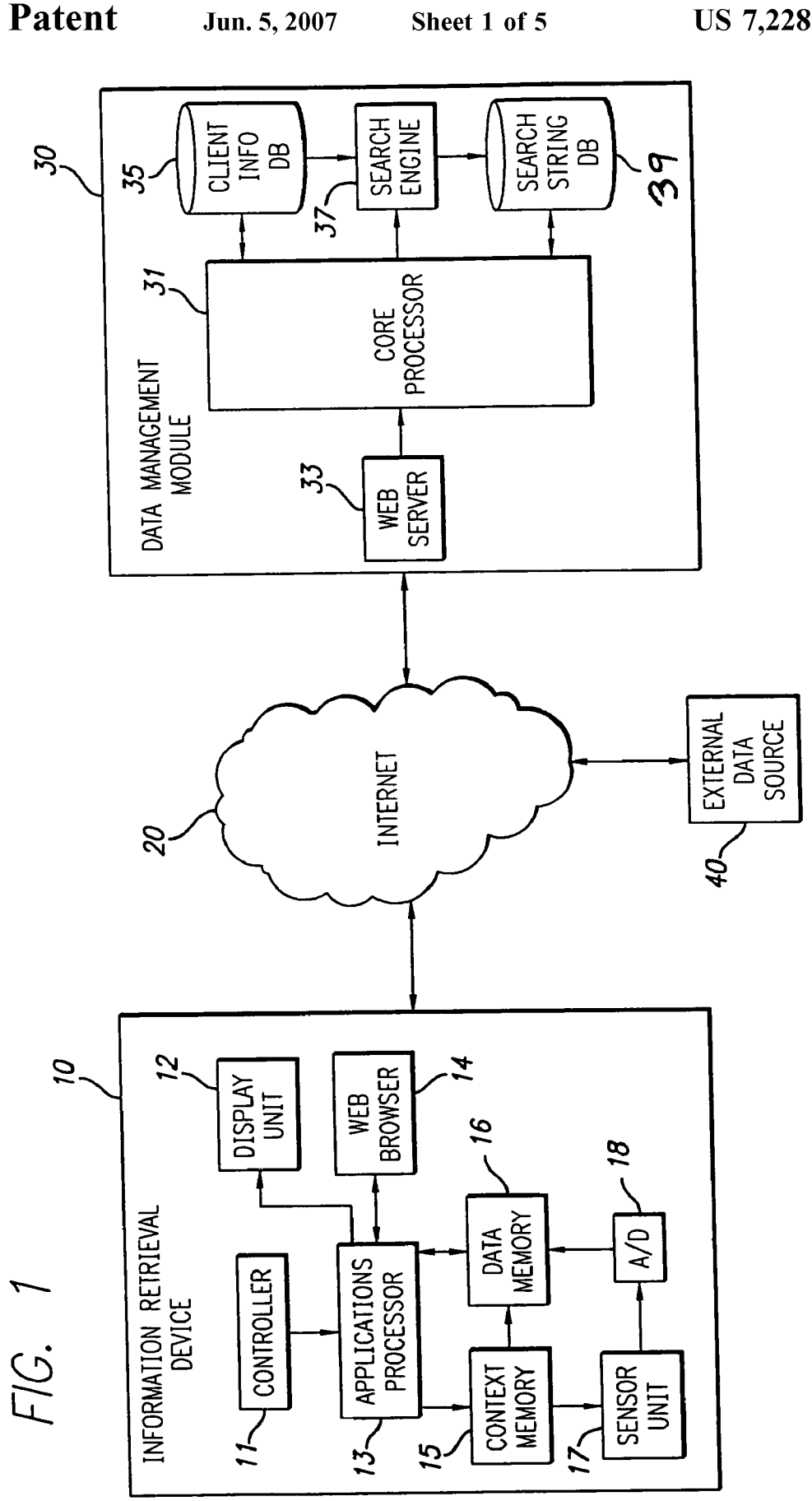
FIG. 1 is a block diagram demonstrating a preferred embodiment of the invention.

Referring first to FIG. 1, a block diagram is illustrated of a wide area network employing a method and apparatus according to an embodiment of the invention. It is anticipated that the present invention operates with a plurality of computers which are coupled together on a wide area network, such as the Internet 20, or other communications network. FIG. 1 depicts such a network which includes an information retrieval device (IRD) 10, a data management module 30, and an external data source 40. The IRD 10 is further comprised of an applications processor 13 coupled to a controller 11, a display unit 12, a Web browser 14, a context memory 15, and a data memory 16. The context memory 15 is shown connected to both a sensor unit 17 and to the data memory 16. The sensor unit 17 is also shown to be connected to an analog-to-digital (A/D) converter 18 which is directly connected to the data memory 16.

In a preferred embodiment, a user determines which sensors it wants to activate using the controller 11 of the IRD 10. These selections are then received by the applications processor 13 where they are relayed to the context memory 15. The context memory 15 includes a set of instructions that activate particular sensors comprising the sensor unit 17 of the IRD 10. The function of the context memory 15 is thus analogous to an instruction cache for the sensor unit 17. Analog sensor data is then passed from the sensor unit to the A/D converter where it is converted to digital data. This digital data is then compressed and temporarily stored in the IRD 10 data memory unit 16 until it is ready to be sent to the data management module 30.

As illustrated, the IRD 10 communicates with the data management module 30 and external data sources 40 via the Internet 20. The data management module 30 is further comprised of a core processor coupled to a client information database 35, a search string database 39, a search engine 37, and a Web server 33 connected to an HTML (Hyper-Text Markup Language) documents database.

It should be appreciated that a search engine 37 typically incorporates a database engine, such as a SQL Server™ engine from Microsoft Corporation or Oracle™ database engine, as part of their architecture. Search engines typically perform searches by operating on a string of characters, known as a "query string." A query string is coded according to a set of rules determined by the database engine and/or a user interface between the database engine and the user. As used herein, a "query" is broader than a "query string," denoting both the query string and the search logic represented by the query string, whereas "query string" refers only to a string of characters, symbols, or codes used to define a query.

It should be further appreciated that Web server 33 accesses a plurality of Web pages, distributable applications, and other electronic files containing information of various types stored in the HTML documents database. As a result, Web pages may be viewed on various web-enabled computers in a given network, such as the information retrieval device 10. For example, a particular Web page or other electronic file may be viewed through a suitable application program residing on the information retrieval device 10 such as a browser 14, or by a distributable application provided to the information retrieval device 10, by the Web server 33. It should be appreciated that many different information retrieval devices, many different Web servers, and many different search servers of various types may be communicating with each other at the same time.

As is generally known in the art, a user identifies a Web page it wishes to retrieve using the information retrieval device 10 by communicating an HTTP (Hyper-Text Transport Protocol) request from the browser application 14. The HTTP request includes the Uniform Resource Locator (URL) of the desired Web page, which may correspond to an HTML document stored in the HTML documents database. The HTTP request is then routed to the Web server 33 via the Internet 20. The Web server 33 then retrieves the HTML document identified by the URL, and communicates the HTML document across the Internet 20 to the browser application 14. The HTML document may be communicated in the form of plural message packets as defined by standard protocols, such as the Transport Control Protocol/Internet Protocol (TCP/IP).

In a preferred embodiment of the invention, the IRD 10 provides users with information received from a data management module 30. In particular, a data management module 30 anticipates the type of information a user desires through real time data taken from the sensor unit 17 of the IRD 10. It should, however, be appreciated that users may have the option of retrieving information by compiling a query which combines this sensor data with data regarding the history of that particular user's "tendencies" stored in the client information database 35. "Tendencies" are defined here as a topical measure of a user's information interests. Various methods may be used to determine a user's tendencies, such as, for example, providing a form or Web page for the user to designate topical areas of interest, analyzing the user's demographic and purchasing information to ascertain likely areas of interest, and analyzing a record or history of the user's prior queries. It may be particularly useful to rank user tendencies in priority order. For example, if tendencies are to be determined from a record of prior queries, the tendencies could be ranked according to factors such as, for example, the frequency with which the same or similar queries have been repeated, the number of related queries in a topical area, and the length of time since the query was repeated. These and various other methods as known in the art may be used to determine a user's tendencies, and the invention is not limited by the method that the determination is made.

Figure 2:
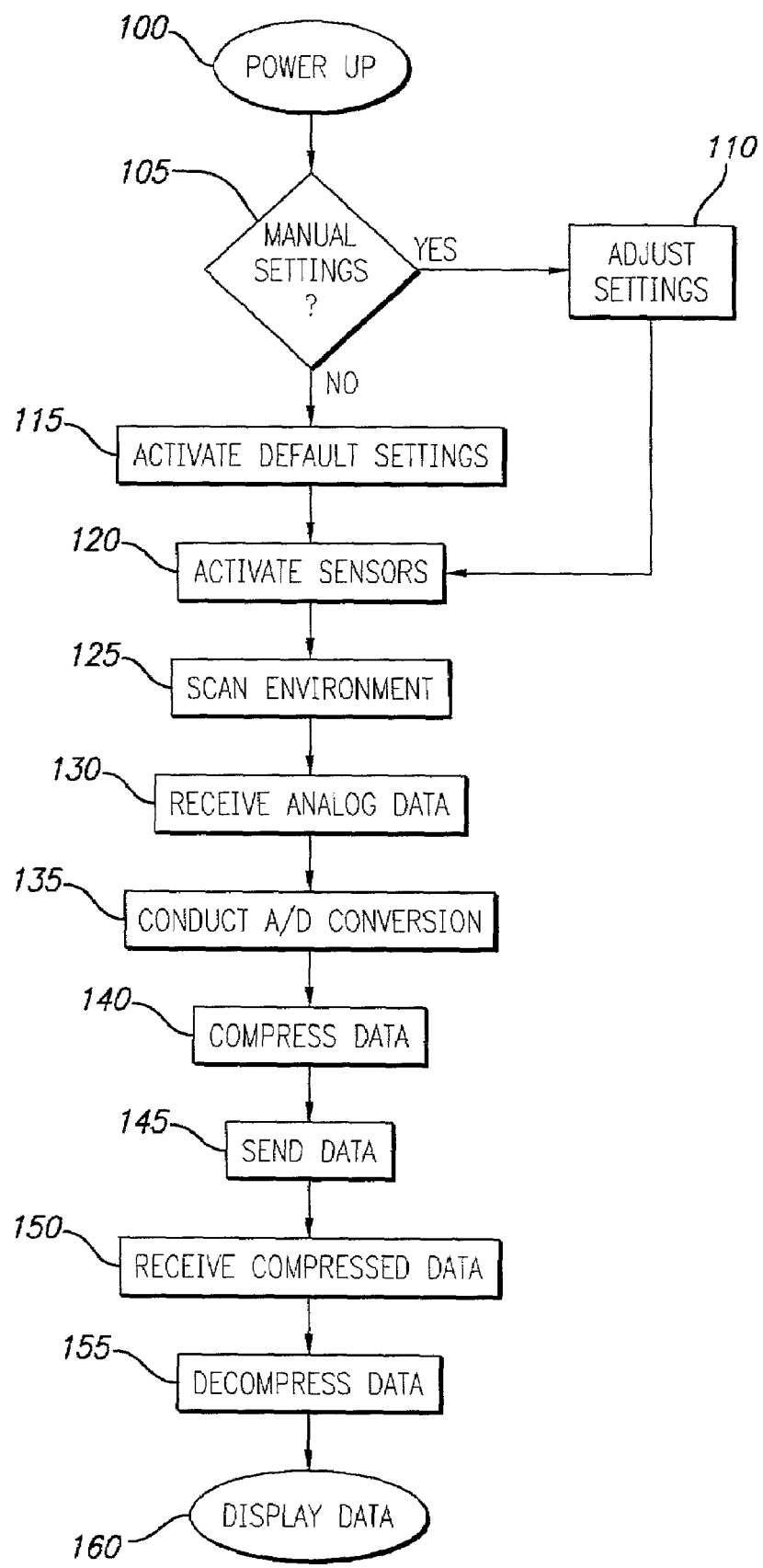
FIG. 2 is a flow chart illustrating the steps for users to access anticipated data according to an embodiment of the invention.
Figure 3:
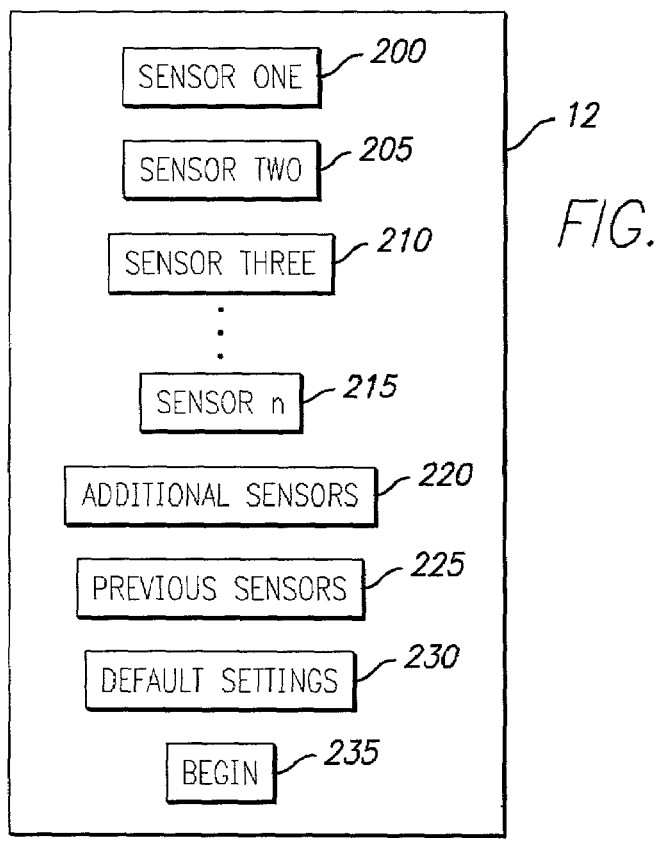
FIG. 3 is a schematic illustration of a sensor activation Web page according to an embodiment of the invention.

In FIG. 2, a flow chart illustrating the steps for users to access such anticipated data according to an embodiment of the invention is shown. The procedure begins with power being applied to the IRD 10 at step 100. The user is then asked which particular sensors it would like to activate at step 105. An example of a sensor activation Web page displayed to the user according to an embodiment of the invention is shown in FIG. 3. As illustrated, the IRD 10 display unit 12 is comprised of various fields. Such fields may comprise a plurality of sensor fields including a "Sensor One" field 200, a "Sensor Two" field 205, a "Sensor Three" field 210, as well as all other sensor fields up to sensor field n 215 (where n represents the total number of sensors available to the user). Other fields displayed to the user may include fields used to scroll through other sensors, not currently displayed, such as an "Additional Sensors" field 220 and a "Previous Sensors" field 225. If the user wishes to activate specific sensors at step 105, then these sensors are selected by the user at step 110 and activated by the IRD 10 at step 120 by selecting the "Begin" field 235 illustrated in FIG. 3; otherwise, the user selects the "Default Settings" field 230 causing the IRD 10 to select sensors specified by its default settings at step 115, and thus activating those default sensors corresponding to these settings at step 120.

Once the appropriate sensors are activated at step 120, the IRD 10 begins to scan its environment according to these sensor settings at step 125. It should be appreciated that this scan procedure may include a plurality of sensors of various types. An exemplary embodiment of the invention may, therefore, include sensors such as a microphone and GPS (Global Positioning System) receiver that respectively scan the IRD 10 environment for sound and location. Within such embodiment, a user may choose to activate both the microphone and the GPS receiver in order to simultaneously ascertain data from both devices.

Returning to the flow chart illustrated in FIG. 2, the IRD 10 then receives analog data from its active sensors at step 130 and converts this data into digital data using the A/D converter 18 at step 135. This digital data is then compressed and temporarily stored in the IRD's data memory unit 16 at step 140 until it is sent to the data management module 30 at step 145 via the Internet 20. The procedure then continues by having the IRD 10 receive compressed feedback data from the data management module 30 at step 150. This data is then decompressed at step 155 and displayed to the user at step 160.

Figure 4:
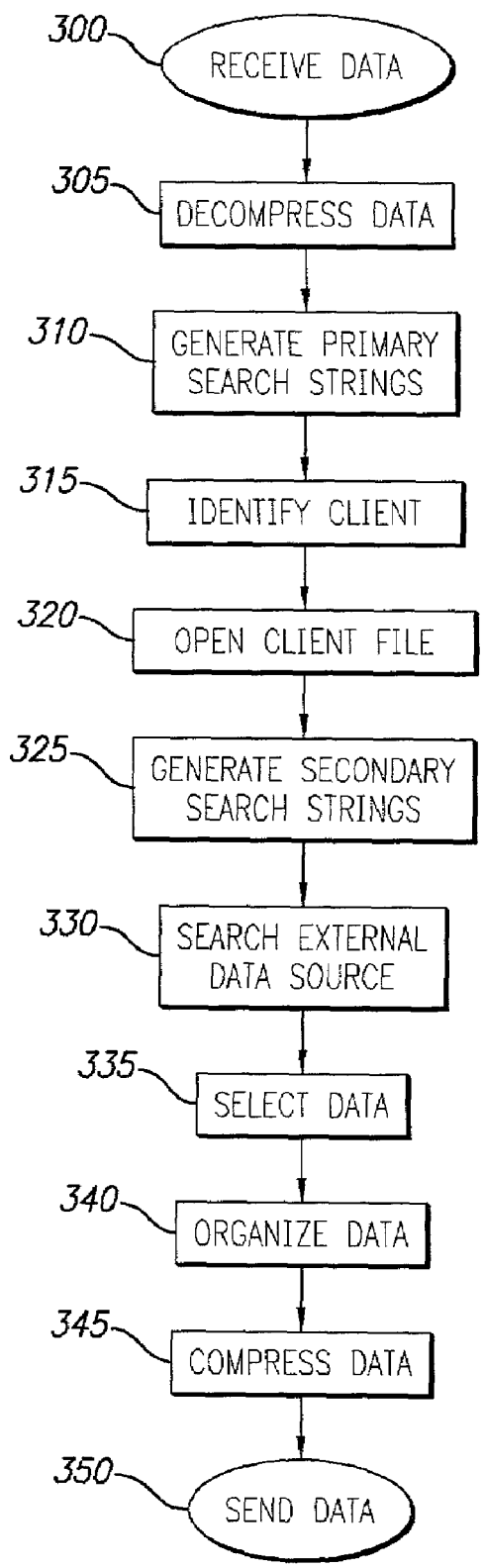
FIG. 4 is a flow chart illustrating the steps for generating anticipated data according to an embodiment of the invention.

In FIG. 4, a flow chart illustrating the steps for generating the feedback data received by the IRD 10 according to an embodiment of the invention is shown. This procedure begins with the data management module 30 receiving a data signal from the IRD 10 at step 300. The received data is then decompressed at step 305 in order to generate primary search strings from data taken from the IRD 10 sensor unit 17 at step 310. The primary search strings generated at step 310 may be viewed as simple query strings, found within the search string database 39 using sensor unit 17 data, which may be used to ascertain information from conventional search engines available through the Internet 20. Such primary search strings may, for example, include "restaurants in city y", which would correspond to data received from both a sound sensor, sensing that the word "restaurant" was said, and from a GPS receiver sensor, sensing that the user is in "city y".

Returning to the flow chart illustrated in FIG. 4, the procedure continues with the data management module 30 determining the identity of the client at step 310. At step 315, the data management module 30 then opens the appropriate customer file from the client information database 35 which optionally opens the client's profile of navigation tendencies. It should be appreciated that these navigation tendencies may be repeatedly calculated at a user-defined rate from within the core processor 31 using an arbitrary statistical weighting system determined either by the user or the IRD 10 manufacturer.

In order to both narrow and customize these searches, an internal search string database 39 may be used simultaneously with the client information database 35 to generate secondary search strings that directly correspond to the tendencies of the user. In particular, the core processor 31 searches for more specific search strings from within the search string database 39 which more accurately reflect the anticipated information desired by the user according to tendency data stored in the customer information database 35. These search strings are then combined with the primary search strings found at step 310 in order to generate secondary search strings at step 325.

The procedure continues at step 330 with an external data source 40 search being made according to the secondary search strings found at step 325. It should be appreciated that the type of external data source 40 used at step 330 may be provided by various embodiments. This external data source 40 may, for example, be provided by a conventional search engine, an external database service provider, or any other data source available via the Internet 20. Depending on the type of data the data management module 30 is attempting to extract from these data sources 40, an internal weighting algorithm is again implemented in order to determine which returned search results best match the information desired by the user as anticipated by the data management module 30. The data management module 30 then selects only those search results receiving a criterion score above some predetermined threshold at step 335, and organizes these selected search results into various electronic folders at step 340. This data is then compressed by the data management module 30 at step 345, and finally sent to the IRD 10 at step 350.

Figure 5:
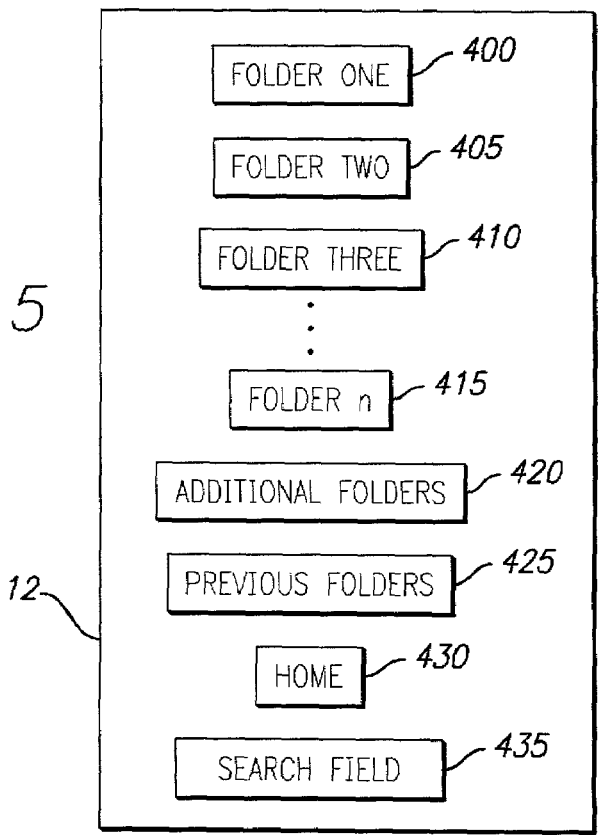
FIG. 5 is a schematic illustration of a Web page with various electronic folders containing links to anticipated data according to an embodiment of the invention.

An example of a Web page including such electronic folders displayed to the user according to an embodiment of the invention is shown in FIG. 5. Similar to the sensor activation Web page described with respect to FIG. 3, the PDA 10 display unit 12 is again comprised of various fields. In this case, however, the display unit 12 may be comprised of a plurality of folder fields which include a "Folder One" field 400, a "Folder Two" field 405, a "Folder Three" field 410 as well as all other folder fields up to folder field n 415 (where n represents the total number of folders displayed to the user). Other fields displayed to the user may include fields used to scroll through other folders, not currently displayed, such as an "Additional Folders" field 420 and a "Previous Folders" field 425. If none of these folders include the user's desired search results, the user may enter its own search string in the field labeled "Search Field" 435. It should be appreciated that any search string entered by the user via the "Search Field", is used by the data management module 30 at step 330 of the flow chart illustrated in FIG. 4 in order to extract data from an external data source 40 according to this particular search string. It should be further appreciated that, at any time, the user may exit the Web page illustrated in FIG. 5 by selecting the "Home" field 430 in order to modify the active sensor settings. As a result of this selection, the IRD 10 would redisplay the sensor activation Web page illustrated in FIG. 3 and thus return the user to step 105 of the flow chart illustrated in FIG. 2.

Figure 6:
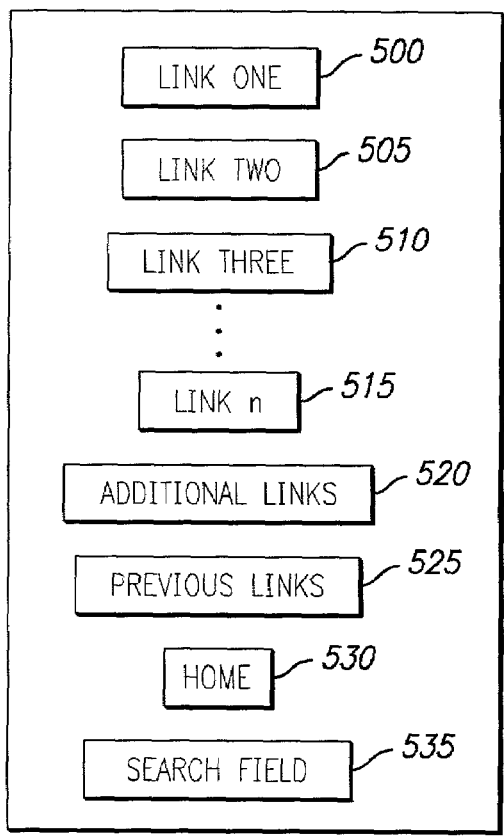
FIG. 6 is a schematic illustration of a Web page with various links to anticipated data according to an embodiment of the invention.

Once a user has selected a particular folder from the Web page illustrated in FIG. 5, another Web page is displayed to the user listing various links related to the selected folder. An example of a Web page including such links according to an embodiment of the invention is shown in FIG. 6. Similar to the aforementioned Web pages described in FIGS. 3 and 5, the IRD 10 display unit 12 is again comprised of various fields. In this case, however, the display unit 12 may be comprised of a plurality of link fields which include a "Link One" field 500, a "Link Two" field 505, a "Link Three" field 510 as well as all other link fields up to link field n 515 (where n represents the total number of links displayed to the user). Other fields displayed to the user may include fields used to scroll through other links, not currently displayed, such as an "Additional Links" field 520 and a "Previous Links" field 525. If none of these links include the user's desired search results, the user may again enter its own search string in the field labeled "Search Field" 535 where, similar to the electronic folder Web page described with respect to FIG. 5, this string is used by the data management module 30 at step 330 of the flow chart illustrated in FIG. 4. Also similar to the electronic folder Web page described with respect to FIG. 5, the user may exit the Web page illustrated in FIG. 6 by selecting the "Home" field 530 in order to modify the active sensor settings at any time.

Figure 7:
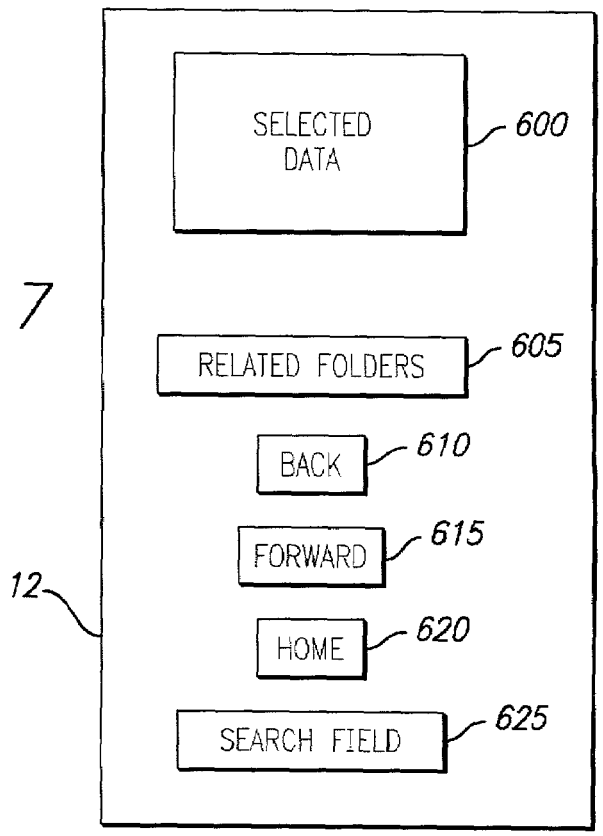
FIG. 7 is a schematic illustration of a Web page displaying anticipated data according to an embodiment of the invention.

Once a user has selected a particular link from the Web page illustrated in FIG. 6, another Web page containing various fields, including a field displaying the data corresponding to the selected link, is displayed to the user. An example of a Web page including such fields according to an embodiment of the invention is shown in FIG. 7. As illustrated, the display unit 12 pertaining to this particular Web page may be comprised of a plurality of fields which include the aforementioned "Selected Data" field 600 containing the data corresponding to the selected link. It should be appreciated that the data displayed to the user in the "Selected Data" field 600 may be provided in various forms. In one embodiment, for example, an investor may wish to analyze the performance of a particular stock. Within this scenario, the investor may be presented with a set of links which may include links to graphs, spreadsheets, or news regarding that particular stock.

Several other fields may also be included on the Web page illustrated in FIG. 7. One such field may include a "Related Folders" field 605 which may be used in order to generate a Web page similar to the one illustrated in FIG. 5 based on a modified search which includes strings related to the data currently being displayed in the "Selected Data" field 600. A "Back" and "Forward" field, 610 and 615 respectively, may also be included in order to navigate through the various Web pages selected by the user. Similar to the Web pages described above with respect to FIGS. 5 and 6, a "Home" field 620 and a "Search Field" 625 having the same functionality as previously described may be included as well.

Within the context of the aforementioned flow charts, it should be appreciated that a plurality of embodiments which include several different types of sensor settings can be envisioned. In one such embodiment, an IRD 10 sensor unit 17 may be comprised of a "Dictation" setting enabling the user to dictate a conversation in real time. In this type of embodiment, a user may simply select the setting corresponding to "Dictation". In other embodiments, more sophisticated "Dictation" settings may also be implemented. Such embodiments may include a textual analysis which launches certain applications whenever particular word patterns or words matching the user's tendency data are detected. For example, if the name "John Doe" is repeatedly detected, the IRD 10 may relay any available information regarding "John Doe" to the user from the data management module 30. For further example, if "John Doe" is detected, and "John Doe" comprises an entry in the user's address book database, the address book and/or other information pertaining to "John Doe" may be retrieved and displayed. It should be appreciated that such information may include user-specific information obtained directly from the data management module 30 (e.g., an address book, calendar, etc.) or information obtained from external data sources 40 (e.g., an online database, search engine, etc.).

Similarly, the IRD 10 may retrieve data on selected terms within the context of other terms being used. Thus, for example, if the term "head end" is used repeatedly with the term "cable", the data management module 30 may conduct a search for these two terms together instead of individually. As a result, the data management module 30 may return information describing the function of a "head end" in conjunction with a cable system.

Another such embodiment may include a hybrid recording and transcription sensor setting which may be used in conjunction with information retrieval services or as a separate feature. In this embodiment, the IRD 10 may generate a running transcript which includes the locations of the speakers relative to the IRD 10 in order to differentiate between different speakers in a conversation. In cases where the IRD 10 is unable to convert a sound into a word, the sound is simply recorded and included in the transcript as a hyperlink. An additional feature to this embodiment may include a real time translator application which translates between languages.

It should be appreciated that the IRD 10 sensor unit 17 may include a GPS receiver that enables the IRD 10 to retrieve information within the context of data received by the GPS receiver. For example, if the GPS signal indicates that the user is in Japan, the data management module 30 may give weight to search results related to Japan. Thus, in the prior example, the terms "head end" and "cable" might also return information about Japanese cable television operators.

It should be further appreciated that the IRD 10 may also anticipate the user's needs by retrieving more specific GPS location data. For example, if the user is entering a video rental store, the IRD 10 may retrieve a list of the most popular rental videos for that week, together with movies being shown on the user's local cable system. Similarly, a user entering a hardware store might be presented with the hardware store's current advertised specials, together with links for reviews of those items. Furthermore, a user may ask a salesperson a question regarding "washers" from which the IRD 10 may distinguish the user's request as being one for plumbing device "washers", as opposed to home appliance "washers", because the user is located in a hardware store. In this respect, the data management module 30 would conduct its search accordingly.

It should also be appreciated that data ascertained from a GPS receiver may also be used to present information about a particular establishment or area the user is in. In this type of embodiment, a real estate broker, for example, may approach a home for sale and receive a list of information regarding that particular home. Such information may include the address of the home, the sale price of the home, and information regarding the neighborhood of the home organized in several electronic folders.

In another embodiment, the IRD 10 may be used to analyze ambient sounds detected by its sensor unit 17. In this embodiment, the IRD 10 may, for example, identify the song and artist of music detected by the sensor unit 17 through a spectral analysis of the sensor data. Similarly, the IRD 10 may also be used to detect sounds from a telephone touch dial and determine the numbers being dialed. An added feature to this embodiment may include a reverse lookup of the phone number which would display information regarding the person on the receiving end of the call.

Having thus described several embodiments of a method and apparatus for delivering content via information retrieval devices, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for anticipating a user's desired information using a information retrieval device (IRD) connected to a computer network, comprising:
   maintaining a database of records containing query strings operable for retrieving data within said computer network;
   receiving sensor data from said user's physical environment via said IRD;
   generating a query using said sensor data to select at least one record of the database;
   retrieving data from external data sources using said query;
   organizing said retrieved data into electronic folders; and
   delivering said organized data to said user.

2. The method of claim 1, further comprising maintaining a database of tendencies related to said user within said computer network.

3. The method of claim 2, wherein said maintaining step further comprises associating said tendencies with respective ones of said users.

4. The method of claim 2, wherein said maintaining step further comprises implementing a weighting algorithm to analyze said tendencies.

5. The method of claim 4, wherein said receiving step further comprises receiving said sensor data from a plurality of sensors.

6. The method of claim 1, wherein said receiving step further comprises receiving said sensor data from a sensor unit.

7. The method of claim 6, further comprising the step of activating respective ones of said plurality of sensors.

8. The method of claim 1, wherein said generating step further comprises analyzing said sensor data.

9. The method of claim 8, further comprising comparing said tendencies with said sensor data.

10. The method of claim 1, wherein said organizing step further comprises ranking said retrieved data according to said tendencies and said sensor data.

11. The method of claim 1, wherein said delivering step further comprises navigating through said delivered data.

12. A system for anticipating a user's desired information, comprising:
   an information retrieval device (IRD) connected to a computer network; and
   a server connected to said computer network and a data management application executing in association with said server to provide the functions of:
      maintaining a database made up of records containing query strings operable for retrieving data within said computer network;
      receiving sensor data from said user's physical environment via said IRD;
      generating a query using said sensor data to select at least one record of the database;
      retrieving data from external data sources using said query;
      organizing said retrieved data into electronic folders; and
      delivering said organized data to said user.

13. The system of claim 12, wherein said server further comprises the function of maintaining a database of tendencies related to said user within said computer network.

14. The system of claim 13, wherein said maintaining function further comprises associating said tendencies with respective ones of said users.

15. The system of claim 13, wherein said maintaining function further comprises implementing a weighting algorithm to analyze said tendencies.

16. The system of claim 12, wherein said IRD further comprises a sensor unit providing said sensor data.

17. The system of claim 16, wherein said sensor unit further comprises a plurality of sensors.

18. The system of claim 17, wherein respective ones of said plurality of sensors are selectively activated by said user.

19. The system of claim 12, wherein said generating function further comprises analyzing said sensor data.

20. The system of claim 19, wherein said server further comprises the function of comparing said tendencies with said sensor data.

21. The system of claim 12, wherein said organizing function further comprises ranking said retrieved data according to said tendencies and said sensor data.

22. The system of claim 12, wherein said delivering function further comprises navigating through said delivered data.

23. The system of claim 12, wherein said IRD further comprises a personal digital assistant.

* * * * *

UNITED STATES PATENT AND TRADEMARK OFFICE
CERTIFICATE OF CORRECTION

PATENT NO.         : 7,228,327 B2                                        Page 1 of 1
APPLICATION NO. : 09/850956
DATED                  : June 5, 2007
INVENTOR(S)         : Gary S. Shuster It is certified that error appears in the above-identified patent and that said Letters Patent is hereby corrected as shown below:

Claim 1, line 4, delete "of" and insert -- made up of -- therefor

Signed and Sealed this

Thirty-first Day of July, 2007

JON W. DUDAS
*Director of the United States Patent and Trademark Office*